(12) United States Patent
Bringer et al.

(10) Patent No.: US 9,742,567 B2
(45) Date of Patent: Aug. 22, 2017

(54) SECONDARY ELEMENTS IN A FUZZY VAULT ENCODING SCHEME

(71) Applicant: MORPHO, Issy les Moulineaux (FR)

(72) Inventors: Julien Bringer, Issy les Moulineaux (FR); Melanie Favre, Issy les Moulineaux (FR)

(73) Assignee: Morpho, Issy les Moulineaux (FR)

( * ) Notice: Subject to any disclaimer, the term of this patent is extended or adjusted under 35 U.S.C. 154(b) by 311 days.

(21) Appl. No.: 14/571,678

(22) Filed: Dec. 16, 2014

(65) Prior Publication Data

US 2015/0180667 A1 Jun. 25, 2015

(30) Foreign Application Priority Data

Dec. 19, 2013 (FR) ...................... 13 63100

(51) Int. Cl.
*H04L 9/08* (2006.01)
*H04L 9/32* (2006.01)
*G06K 9/00* (2006.01)

(52) U.S. Cl.
CPC ........ *H04L 9/3231* (2013.01); *G06K 9/00006* (2013.01); *H04L 9/0816* (2013.01); *G06K 2009/00953* (2013.01); *H04L 2209/24* (2013.01)

(58) Field of Classification Search
CPC .. H04L 9/3231; H04L 9/0816; H04L 2209/24
USPC ......................................................... 380/28
See application file for complete search history.

(56) References Cited

U.S. PATENT DOCUMENTS

| 2006/0123241 A1* | 6/2006 | Martinian | ............. H04L 9/3231 713/186 |
| 2009/0262990 A1* | 10/2009 | Choi | ....................... G06F 21/32 382/125 |
| 2009/0271634 A1* | 10/2009 | Boult | ..................... G06F 21/32 713/186 |

FOREIGN PATENT DOCUMENTS

WO    WO 2013/135846 A1    9/2013

OTHER PUBLICATIONS

Julien Bringer et al. "Binary Feature Vector Fingerprint Representation From Minutiae Vicinities", IEEE International Conference on Biometrics: Theory, Applications, and Systems, 2010, 6 pages.
Abhishek Nagar et al. "Securing Fingerprint Template: Fuzzy Vault with Minutiae Descriptors", Proceedings—International Conference on Pattern Recognition, 2008, 4 pages.
French Preliminary Search Report issued Sep. 12, 2014 in French Application 13 63100, filed on Dec. 19, 2013 (with English Translation of Categories of Cited Documents and Written Opinion).
(Continued)

*Primary Examiner* — Izunna Okeke
*Assistant Examiner* — Angela Holmes
(74) *Attorney, Agent, or Firm* — Christensen O'Connor Johnson Kindness PLLC (57) ABSTRACT

The description relates in particular to a method for encoding information represented in the form of a function P, and to a corresponding method for decoding information. The encoding comprises the encoding of secondary information. These methods may be implemented within a context of biometric enrollment and (respectively) biometric authentication.
The description also relates to an electronic device, a computer program, and a storage medium for the implementation of such methods.

10 Claims, 4 Drawing Sheets

(56) References Cited

OTHER PUBLICATIONS

Julien Bringer et al. "Adding localization information in a fingerprint binary feature vector representation", Sensing Technologies for Global Health, Military Medicine, Disaster Response, and Environmental Monitoring; and Biometric Technology for Human Identification VIII, SPIE, vol. 8029, No. 1, 2011, 10 pages.
Umut Uludag et al. "Securing Fingerprint Template: Fuzzy Vault with Helper Data", Computer Vision and Pattern Recognition Workshop, XP010922678, 2006, 8 pages.
Jesse Hartloff et al. "Towards Fingerprints as Strings: Secure Indexing for Fingerprint Matching", 2013 International Conference on Biometrics, 2013, 6 pages.
Ari Juels et al. "A Fuzzy Vault Scheme", Designs, Codes and Cryptography, vol. 38, No. 2, 2006, 21 pages.
Ari Juels et al. "A Fuzzy Vault Scheme", Designs, Codes and Cryptography, vol. 38, No. 2, 2006, 18 pages.
Rahul Hooda et al. "Fingerprint Fuzzy Vault: A Review", International Journal of Advanced Research in Computer Science and Software Engineering, vol. 3, Issue 4, 2013, 4 pages.

\* cited by examiner

SECONDARY ELEMENTS IN A FUZZY VAULT ENCODING SCHEME

The invention relates to the field of encoding, and particularly to the fuzzy vault encoding described by A. Juels and M. Sudan (A Fuzzy Vault Scheme, ISIT 2002).

Fuzzy vault encoding is a technique for securely calculating set overlaps which consists of locking secret information using a set of elements drawn from a public universe. The secret information is represented by a polynomial P of degree less than k over a finite field Fq. At the time of enrollment, the polynomial P is evaluated over the points of the input set. This information is then drowned in noise.

At verification, if the set presented is sufficiently close to the input set, the polynomial P can be retrieved by interpolation.

An example of using fuzzy vault encoding is as follows. Alice is a movie lover and wants to meet people who have similar tastes. She encodes her phone number (secret data) in k=14 symbols (polynomial of degree not exceeding 13). The set A of her n=22 favorite movies is used to lock the vault. With a fuzzy vault, Bob can unlock Alice's number if he provides a set B of movies in which at least (n+k)/2=18 are in common with those of Alice.

Another example relates to the use of encoding for biometric data. It is known to use a binary vector of a biometric trait as data for the lock. For example, the encoding proposed by J. Bringer and V. Despiegel in "Binary feature vector representation from minutiae vicinities" (BTAS 2010) allows obtaining a binary vector of size N from a fingerprint. The 1-bits in the vector indicate the presence of a representative of minutiae vicinities in the fingerprint, while 0-bits indicate no corresponding representative. One can therefore describe a fuzzy vault-based authentication as follows.

In the enrollment stage, for each binary element of index i between 1 to N of the binary vector, if this binary element is 1, then the fuzzy vault vector of size N (and based on a polynomial P) is, at index i, equal to P(i). Otherwise, it is equal to a randomly chosen number.

During the verification stage, a binary vector thought to be close to the enrolled binary vector is retrieved. Then one extracts from the fuzzy vault generated during enrollment all elements of index i where the binary vector thought to be close to the enrolled binary vector is equal to 1. If there is no fraud or error, the extracted elements are polynomial values which can be interpolated to find the polynomial for comparison to the polynomial actually used (for example one can compare the respective hashes h(P) and h(P') of the two polynomials P and P'). The authentication succeeds if the interpolated polynomial corresponds to the polynomial actually used; otherwise it fails.

However, on occasion there may be secondary information available that one would like to integrate into the fuzzy vault encoding. One solution has been proposed by Umut Uludag and Anil Jain of the University of Michigan in their 2006 article, "Securing Fingerprint Template: Fuzzy Vault with Helper Data", but this may not be appropriate in some cases. In particular, the secondary information included with this technique is not integrated in a secure manner into the fuzzy vault.

Another fuzzy vault solution with integration of secondary information has been proposed by Abhishek Nagar, Karthik Nandakumar, and Anil Jain in their article "Securing Fingerprint Template: Fuzzy Vault with Minutiae Descriptors" in 2007. The invention aims to improve the situation.

One aspect of the invention relates to a method for encoding information represented in the form of a function P, comprising:

/a/ obtaining, by an encoding electronic circuit, respective indexes of K main elements, each corresponding to an element of an indexed set of N possible elements, in this indexed set of N possible elements, /b/ obtaining, by the encoding electronic circuit, K secondary elements respectively associated with the K main elements, each secondary element being able to assume s values, /c/ generating, by the encoding electronic circuit, an indexed set of R encoded elements comprising K encoded main elements, R being an integer between K+1 and N, using the function P and an injective function TR having for the starting set the set of the N indexes of the indexed set of N possible elements and having for the target set the starting set of function P with the starting set of function TR removed, generating the encoded element of index i of the indexed set of R encoded elements comprising generating s+1 components, namely:

/c1/ when the index i is not equal to any of the indexes of the K main elements in the indexed set of N possible elements, generating by the encoding electronic circuit, s+1 simulated components, and /c2/ when the index i is equal to the index of one of the K main elements in the indexed set of N possible elements:

/c2A/ generating, by the encoding electronic circuit, an encoded main element in the form of a component equal to P(i) at a first defined position of the generated components, /c2B/ generating, by the encoding electronic circuit, a component obtained using P(TR(i)) at a second defined position of the generated components, the second defined position being a function of the secondary element corresponding to the main element whose index in the indexed set of N possible elements is the index i, and /c2C/ generating, by the encoding electronic circuit, s−1 simulated components.

This method is particularly advantageous in that it allows the integration of secondary elements in the encoding, and does so while providing twice the valuations of the polynomial P as in the classic fuzzy vault (or even more, since nothing prohibits integrating more than one secondary element per main element), which improves authentication performance. The method also provides more noise (simulated components such as random numbers), which increases security.

The secondary elements can often provide better accuracy, and in the case of an application in biometrics, can improve authentication performance.

For example, in the first example of the prior art discussed above, Alice may decide to refine her search for movie lovers by adding, for example, to each of her favorite movies (each represented by a main element) a secondary element indicating whether the film in question is one or her ten favorite movies. Bob can do the same with his own list. An algorithm can then count a certain number of points for each film in common with Alice, and if this film is also one of the ten films for both Alice and Bob, can double the points counted; the total number of points then allows more precisely measuring the degree of cinematographic similarity between Alice and Bob.

In the second example given (biometric application), the encoding proposed by J. Bringer and V. Despiegel in "Binary feature vector representation from minutiae vicinities" (BTAS 2010) can be improved as proposed by J. Bringer, V. Despiegel, and M. Favre in "Adding localization information in a fingerprint binary feature vector representation" (SPIE 2011) by adding to each main element (minutia vicinity) a secondary element specifying the angle of the central minutia of the minutia vicinity being considered. This improves the authentication.

Another aspect of the invention relates to a method for decoding information represented in the form of a function, comprising:

/d/ obtaining, by a decoding electronic circuit, an indexed set of R encoded elements, /e/ obtaining, by the decoding electronic circuit, respective indexes of K' presumed main elements, each corresponding to an element of an indexed set of N possible elements used to obtain the indexed set of R encoded elements, in this indexed set of N possible elements, /f/ obtaining, by the decoding electronic circuit, K' presumed secondary elements respectively associated with the K' presumed main elements, each secondary element being able to assume s values, /g/ extracting, by the decoding electronic circuit, each encoded element whose index in the indexed set of R encoded elements is equal to the index of one of the K' presumed main elements in the indexed set of N possible elements, /h/ for each encoded element thus extracted, obtaining by the decoding electronic circuit, based on said encoded element, a first point whose abscissa is the index i of said encoded element in the indexed set of R encoded elements and whose ordinate is the value of the component located at a first defined position of said encoded element, and a second point whose abscissa is the result of applying a given injective function TR to the index i of said encoded element in the indexed set of R encoded elements and whose ordinate is the value of the component located at a second defined position of said encoded element, the second defined position being a function of the presumed secondary element corresponding to the presumed main element whose index i in the indexed set of N possible elements is the same as the index i of said encoded element in the indexed set of R encoded elements, /i/ obtaining, by the decoding electronic circuit, a decoded function P, by decoding the points thus obtained.

This decoding method is advantageous in that it makes use of the encoded elements generated by an encoding method according to an aspect of the invention.

Another aspect of the invention relates to an encoding electronic circuit (respectively decoding), arranged to implement the encoding method (respectively decoding method) according to the aforementioned aspects of the invention.

Another aspect of the invention relates to a computer program comprising a sequence of instructions which, when executed by a processor, result in the processor carrying out a method according to one of the aforementioned aspects of the invention.

Another aspect of the invention relates to a non-transitory computer-readable storage medium, said medium storing a computer program according to the above aspect of the invention.

Other aspects, aims, and advantages of the invention will become apparent on reading the following description of some of its embodiments.

The invention will also be better understood by referring to the drawings, in which.

Figure 1:
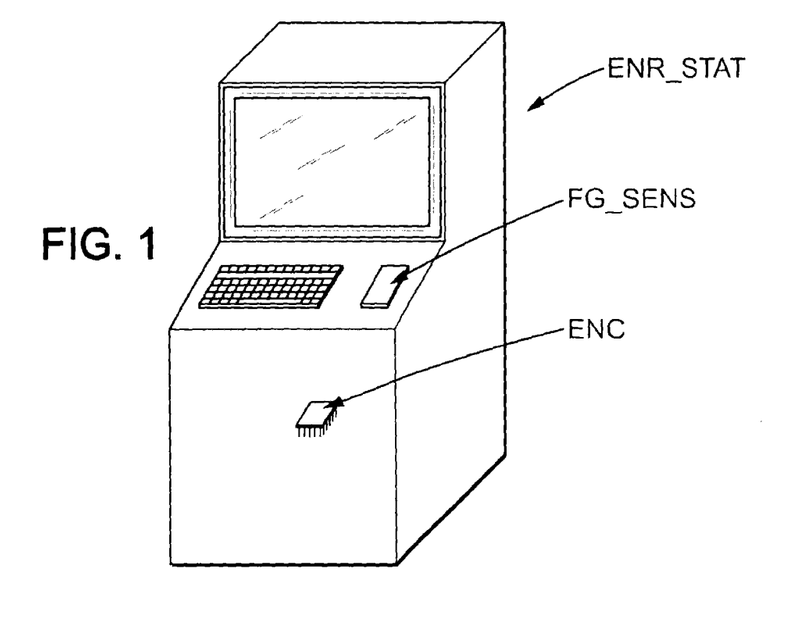
FIG. 1 illustrates an enrollment station.

FIG. 1 shows an enrollment station ENR_STAT. This may be a dedicated computer in the form of a kiosk. The enrollment station includes a fingerprint sensor FG_SENS. The captured fingerprints are processed by an encoding electronic circuit ENC. The enrollment station can be used in an administrative center for example, for programming the biometric data of the bearer of an official document such as an electronic passport, an electronic identity card, or an electronic driver's license. Other applications are of course possible. The enrollment station may take other forms. It may consist, for example, of a smart phone equipped with a fingerprint sensor, or a personal computer equipped with a fingerprint sensor, or a personal computer connected to an external fingerprint scanner (which can be connected via a USB port for example).

Figure 2:
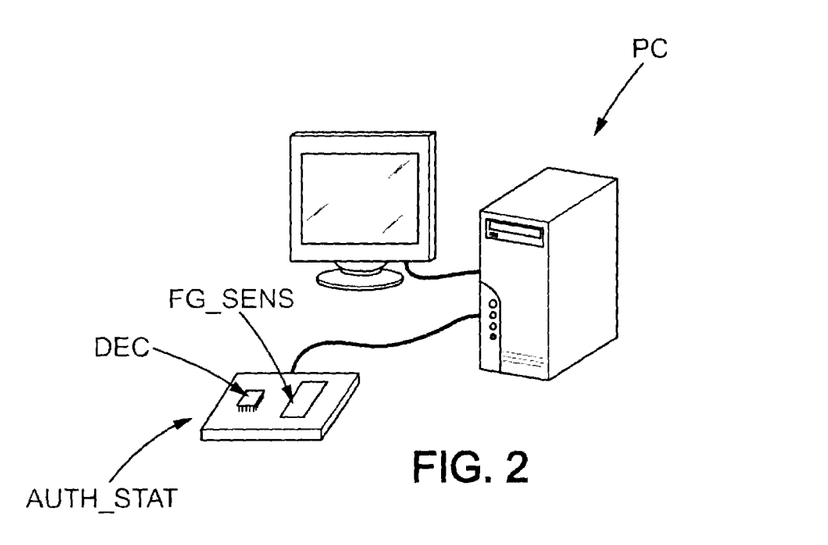
FIG. 2 illustrates an authentication station.

FIG. 2 shows an authentication station AUTH_STAT. This may be a dedicated computer in the form of a tablet connected to a PC (for example via a computer network or a USB port). This authentication station includes a fingerprint sensor FG_SENS. The captured fingerprints are processed by a decoding electronic circuit DEC. The authentication station can be used for example in an airport, to check the biometric data of a person carrying an official document (such as an electronic passport or electronic identity card) who wishes to cross the border. The authentication station can also be used at roadside check points for example (as part of the equipment of a police car or police station). Other applications are of course possible. The authentication station may take other forms. It may consist, for example, of a smart phone equipped with a fingerprint sensor, or a personal computer equipped with a fingerprint sensor, or a personal computer connected to an external fingerprint scanner (which can be connected via a USB port for example). It can allow a user who has previously enrolled to access all kinds of commercial or administrative services via a biometric authentication mechanism.

Figure 3:
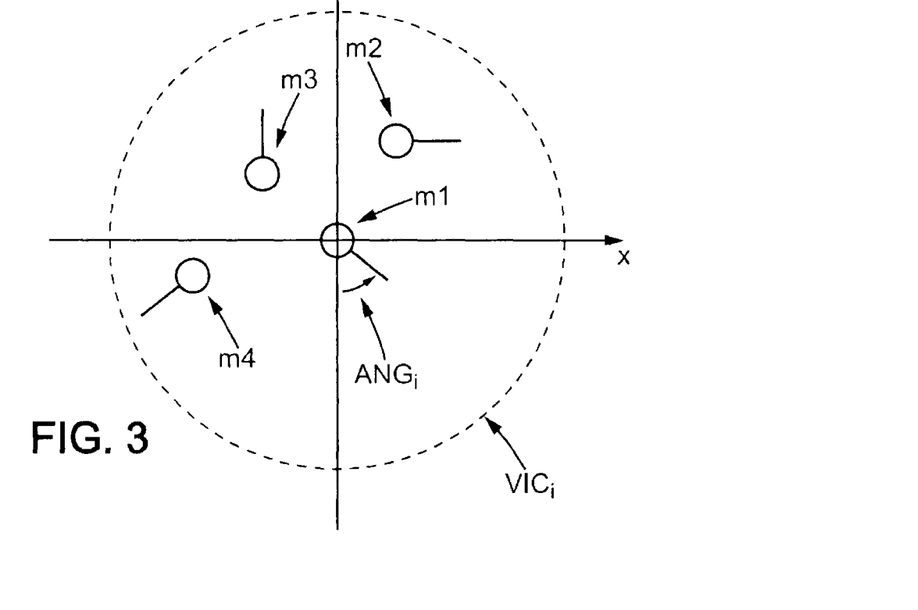
FIG. 3 illustrates a main element corresponding to a fingerprint and an associated second element.

FIG. 3 illustrates a main element $VIC_i$ corresponding to a fingerprint, and an associated secondary element $ANG_i$. In one possible implementation, during an enrollment, an encoding circuit ENC extracts from a fingerprint a series of main elements $VIC_1 \ldots VIC_K$ of the type shown. Each main element and in particular main element number i (shown) corresponds to a vicinity of the fingerprint. This vicinity includes a number of minutiae (here four minutiae m1 to m4). Each minutia (represented by a circle) is characterized by its orientation, identified by a radial segment projecting from this circle. The central minutia is denoted m1. When the vicinity concerned $VIC_i$ is saved, the orientation $ANG_i$ of the central minutia m1 is considered (according to one possible embodiment) as being the orientation of the vicinity. This orientation is defined according to one possible embodiment as the angle $ANG_i$ between the vector $(0,-1)$ (meaning a vertical vector along the y-axis, pointing downwards) of a direct orthonormal coordinate system centered on minutia m1, and said radial segment of this minutia m1. Of course, the angle can also be measured relative to a horizontal vector along the x-axis (or relative to any other reference vector).

Figure 4:
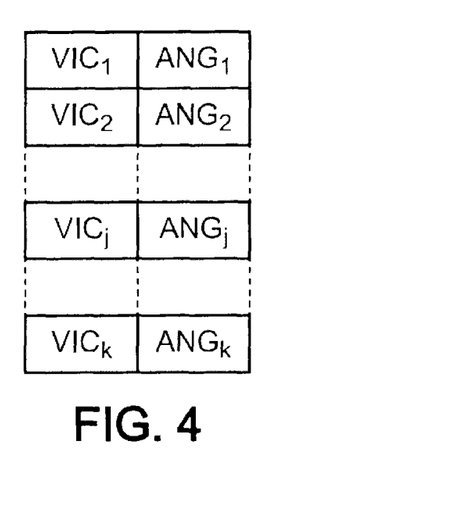
FIG. 4 illustrates a vector comprising main elements and associated secondary elements originating from an enrollment.

FIG. 4 illustrates a vector comprising main elements $VIC_i$ and associated secondary elements $ANG_i$ originating from an enrollment. This is a vector with K elements where each element consists of a vicinity $VIC_i$ and the associated orientation ($ANG_i$) of this vicinity.

Figure 5:
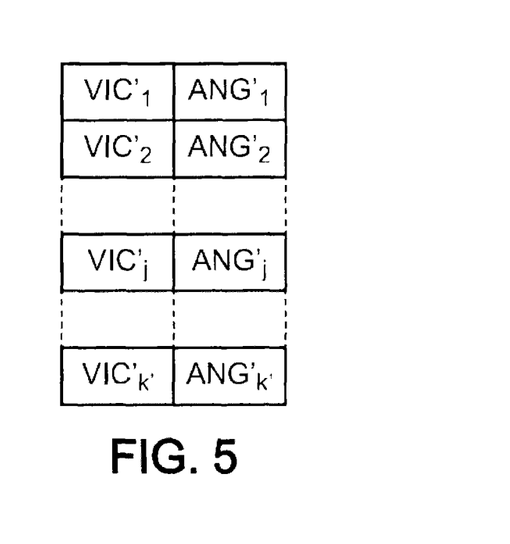
FIG. 5 illustrates a vector comprising main elements and associated secondary elements originating from an authentication process.

FIG. 5 illustrates a vector comprising main elements $VIC'_i$ and associated secondary elements $ANG'_i$ originating from an authentication process. This is a vector with K' elements where each element consists of a vicinity $VIC'_i$ and the associated orientation $ANG'_i$ of this vicinity.

Figure 6:
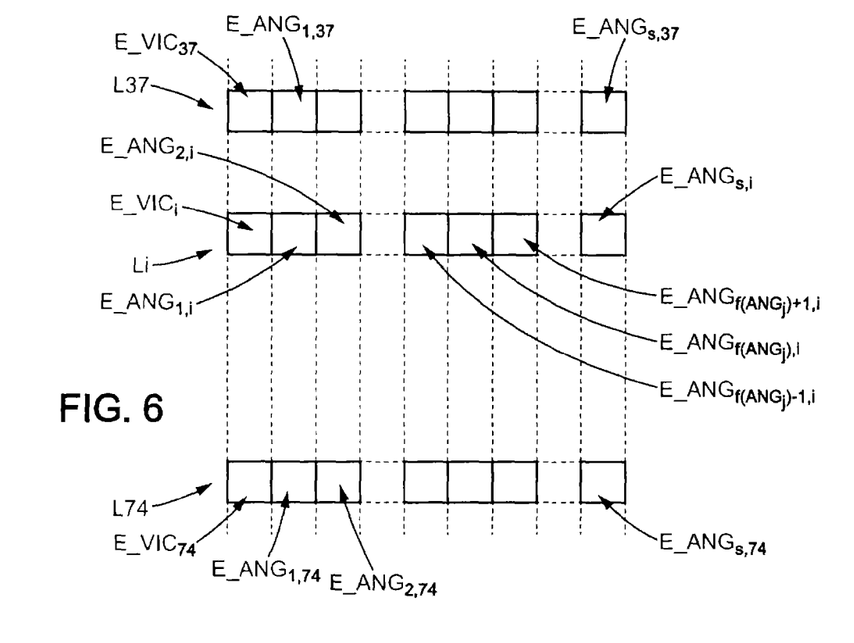
FIG. 6 illustrates a vector comprising an adapted fuzzy vault vector according to the invention, originating from an enrollment.

FIG. 6 illustrates a vector comprising an adapted fuzzy vault vector according to the invention, originating from an enrollment. This vector comprises N encoded elements, of which only three are represented. The first of them is the $37^{th}$ encoded element (located in row L37) and corresponds (in the example shown) to the first main element $VIC_1$ (it is possible for other main elements to be represented in encoded form before this $37^{th}$ row, meaning between row L1 and row L36). The main element $VIC_1$ is encoded in form $E\_VIC_{37}$ and is associated with s encoded secondary elements $E\_ANG_{1,37}$ ... $E\_ANG_{s,37}$. Together, the first encoded main element $E\_VIC_{37}$ and the encoded secondary elements $E\_ANG_{1,37}$ ... $E\_ANG_{s,37}$ constitute the 37th encoded element of the fuzzy vault. The second encoded element represented is the $i^{th}$ element (located in the $i^{th}$ row denoted Li, i being greater than 37 and less than 74) and corresponds (in the example shown) to the $j^{th}$ main element $VIC_j$ (it is possible for other main elements to be represented in encoded form between the $38^{th}$ and the $(i-1)^{th}$ row). The main element $VIC_j$ is encoded in form $E\_VIC_i$ and is associated with s encoded secondary elements $E\_ANG_{1,i}$, $E\_ANG_{2,i}$, ... $E\_ANG_{f(ANGj)-1,i}$ $E\_ANG_{f(ANGj),i}$, $E\_ANG_{f(ANGj)+1,i}$ ... $E\_ANG_{s,i}$. Together, the $i^{th}$ encoded main element $E\_VIC_i$ and the encoded secondary elements $E\_ANG_{1,i}$ ... $E\_ANG_{s,i}$ constitute the $i^{th}$ encoded element of the fuzzy vault. Lastly, the third encoded element is the $74^{th}$ element (located in row L74) and corresponds (in the example shown) to the $2^{nd}$ main element $VIC_2$ (it is possible for other main elements to be represented in encoded form between the $(i+1)^{th}$ and the $73^{rd}$ row or in the $75^{th}$ row or in the following rows). The main element $VIC_2$ is encoded in form $E\_VIC_{74}$ and is associated with s encoded secondary elements $E\_ANG_{1,74}$, $E\_ANG_{2,74}$, ... $E\_ANG_{s,74}$. Together, the $74^{th}$ encoded main element $E\_VIC_{74}$ and the encoded secondary elements $E\_ANG_{1,74}$ ... $E\_ANG_{s,74}$ constitute the $74^{th}$ encoded element of the fuzzy vault.

Figure 7:
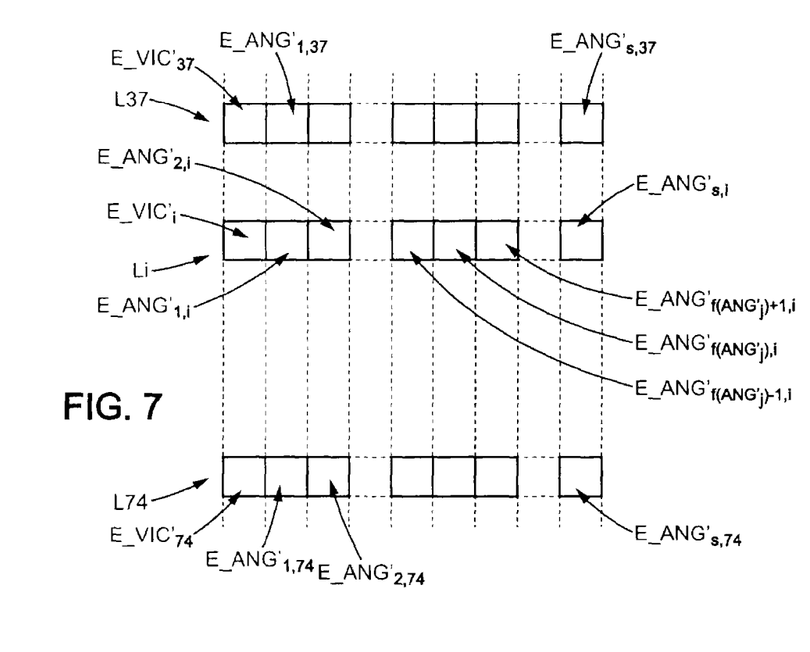
FIG. 7 illustrates a vector comprising an adapted fuzzy vault vector according to the invention, originating from an authentication process.

FIG. 7 illustrates a vector comprising an adapted fuzzy vault vector according to the invention, originating from an authentication process. This vector is similar to the one obtained from the enrollment process (FIG. 6) and the comments for FIG. 6 apply to FIG. 7.

According to a first embodiment, a method for encoding information represented in the form of a function P comprises the obtaining, by an encoding electronic circuit ENC, of respective indexes of K main elements $VIC_1$, $VIC_2$, ... $VIC_K$ each corresponding to an element of an indexed set of N possible elements, in this indexed set of N possible elements. In one possible implementation, these main elements originate from biometric data.

In one possible implementation, the function P is a polynomial function. However, in an alternative implementation, the function P is, for example, an evaluation function on algebraic curves (an algebraic curve is an algebraic variety over a field whose irreducible components are 1-dimensional). In the rest of the description of this first embodiment, the function P is a polynomial function (or more concisely a polynomial, equating the polynomial and the corresponding polynomial function).

Thus, if the indexed set of N possible elements comprises ten elements $E_1$ to $E_{10}$ with respective indexes 1 to 10, if there are three main elements $VIC_1$, $VIC_2$ and $VIC_3$, and if $VIC_1=E_4$, $VIC_2=E_7$ and $VIC_3=E_9$, then the respective indexes of the K=3 main elements $VIC_1$, $VIC_2$ and $VIC_3$ in this indexed set of N=10 possible elements are the indexes 4, 7 and 9 (and not 1, 2 and 3). Of course, the N indexes can be numbered from 1 to N, from 0 to N−1, or by any appropriate range of values.

The obtaining that is performed may be a receiving (possibly from another electronic circuit) or a calculation by the encoding electronic circuit itself. In the case of receiving, it is not necessary to receive the indexes explicitly (for example in the form of a list of indexes). It is sufficient, for example (although obtaining an explicit list of indexes is possible), to receive a vector of size N, in which each element has a 1-bit to indicate that the relevant element of the vector corresponds to a main element, the bit being a 0-bit to indicate that the relevant item of the vector does not correspond to any main element. In the previous example, obtaining the binary vector [0,0,0,1,0,0,1,0,1,0] is thus equivalent to receiving the list of indexes {4, 7, 9}, since the indexes are immediately derivable from the vector concerned.

In one possible implementation, the encoding electronic circuit is a dedicated electronic circuit such as an FPGA, an ASIC, a PAL (or any other configurable electronic component), or possibly a fully customized electronic component. In another possible implementation, the encoding electronic circuit comprises both a processor and associated memory (for example RAM, EEPROM, Flash, ROM, magnetic memory, optical memory, etc.), the associated memory comprising a program (stored in the memory) able to execute a method according to the first embodiment (or, alternatively, able to execute a substantial part of said method).

K and N are positive integers. N is greater than K. The polynomial P is a univariate polynomial over a set comprising at least $(M+1)*N$ elements, where M is a strictly positive integer (in one possible implementation, M is 1). This set may consist of natural numbers or integers. In one possible implementation, this set is a finite field. In one possible implementation, the information represented by the polynomial P is encoded in the coefficients of the polynomial P. This polynomial is secret (it should not be accessible to third parties wishing to apply the corresponding decoding if the third party is not so authorized).

The encoding method according to the first embodiment comprises the obtaining, by the encoding electronic circuit ENC, of K secondary elements $ANG_1$, $ANG_2$, ... $ANG_K$ respectively associated with the K main elements $VIC_1$, $VIC_2$, ... $VIC_K$ (meaning that $ANG_j$ is associated with $VIC_j$ for any j within the K possible indexes), each secondary element $ANG_1$, $ANG_2$, ... $ANG_K$ being able to assume s values. In one possible implementation, each secondary element comprises a plurality of sub-elements (for example an angular orientation sub-element and a position sub-element). These s values can then be subdivided into ranges of values each allocated to a respective sub-element. For example, each secondary element can be encoded in b bits (s then being equal to $2^b$), certain bit ranges being allocated to certain sub-elements (for example b=5, 3 bits being reserved for one sub-element and 2 bits being reserved for another sub-element).

In one possible implementation of the first embodiment (called "implementation comprising a plurality of secondary elements per main element"), the encoding method comprises the obtaining, by the encoding electronic circuit ENC, of more than K secondary elements. For example, according to this implementation M is strictly greater than 1, and the encoding method comprises the obtaining, by the encoding electronic circuit ENC, of M*K secondary elements $ANG_{1,1}$, $ANG_{2,1}$, ... $ANG_{K,1}$, (alternative notation for elements $ANG_1$, $ANG_2$, ... $ANG_K$ of the preceding paragraph), $ANG_{1,2}$, $ANG_{2,2}$, ... $ANG_{K,2}$, ... $ANG_{1,M}$, $ANG_{2,M}$, ... $ANG_{K,M}$ associated with the K main elements $VIC_1$, $VIC_2$, ... $VIC_K$. More specifically, the M secondary elements $ANG_{j,k}$ (k ranging from 1 to M) are associated with $VIC_j$ for any j within the K possible indexes. Each secondary element $ANG_{1,k}$, $ANG_{2,k}$, ... $ANG_{K,k}$ can assume $s_k$ values ($s_1$ being an alternative notation for the s of the preceding paragraph). In one possible implementation, each secondary element comprises a plurality of sub-elements (for example an angular orientation sub-element and a position sub-element). These $s_k$ values can thus be subdivided into value ranges each allocated to a respective sub-element. For example, each secondary element can be encoded in bk bits ($s_k$ then being equal to $2^{bk}$), specific bit ranges being allocated to specific sub-elements (for example for any k with bk=5, 3 bits being reserved for one sub-element and 2 bits being reserved for another sub-element).

The encoding method according to the first embodiment comprises the generation, by the encoding electronic circuit ENC, of an indexed set of R encoded elements, using the polynomial P and an injective function TR (which may be public and which in any case is shared with the decoding electronic circuit so that the decoding is performed correctly).

R is an integer between K+1 and N. In one possible implementation R=N. The closer R is to N, the more secure the method, and the closer R is to K+1, the faster and more memory efficient the method (but less secure). Even when R<N, the indexed set of R encoded elements always includes K encoded main elements (the "missing" elements are elements other than those corresponding to the main elements). In the following description of the first embodiment, R=N unless otherwise specified.

This indexed set of N encoded elements is, for example, a vector of size N (containing N encoded elements). The injective function TR has as its starting set the set of N indexes of the indexed set of N possible elements. For example, the injective function TR is applied to the integers between 1 and N, and this is how the indexes are assigned (or to the integers between 0 and N−1, if such is the convention used for numbering the indexes). The injective function TR has for its target set the starting set of the polynomial P with the starting set of function TR removed. For example, if the polynomial takes its values within 1 ... 2*N, then the function has for its target set N+1 ... 2*N. An example of function TR is the function which associates index i with index i+N. Of course, other functions TR are possible (for example the function that associates index i with index 2*N+1−i, where i varies between 1 and N). Generating the encoded element of index i (for any i among the N possible indexes i) of the indexed set of N encoded elements comprises generating s+1 components $E\_VIC_i$, $E\_VIC_{1,i}$, $E\_ANG_{2,i}$, ... $E\_ANG_{s,i}$. In one possible implementation, these s+1 components are saved in the order indicated (first $E\_VIC_i$, then $E\_ANG_{1,i}$, $E\_ANG_{2,i}$, ... up to $E\_ANG_{s,i}$) or in an arbitrary order, but this order is predefined so that it is possible to selectively access these components during decoding (by knowing their order during encoding) from among the N*(s+1) components generated. Of course, the fact that the method generates s+1 components for the encoded element of index i does not exclude its generating more than s+1 components, as is explained in the following paragraph (however, in one possible implementation, M=1 and the method generates exactly s+1 components).

In the case of the implementation comprising a plurality of sub-elements per main element, the encoding method according to the first embodiment comprises, in one possible implementation, the generation, by the encoding electronic circuit ENC, of an indexed set of N encoded elements, using the polynomial P and M injective functions $TR_1$, $TR_2$ ... $TR_M$ (which may be public and which in any case are shared with the decoding electronic circuit so that the decoding is performed correctly), $TR_1$ being an alternative notation for the function TR of the preceding paragraph. This indexed set of N encoded elements is, for example (as described previously), a vector of size N (containing N encoded elements). The injective functions $Tr_k$ have as the starting set the set of N indexes of the indexed set of N possible elements. For example, for all k, an injective function $TR_k$ is applied to the integers between 1 and N if that is how the indexes are assigned (or to the integers between 0 and N−1, if such is the convention adopted for numbering the indexes). The injective functions $TR_k$ have as the target set the starting set of the polynomial P with the starting set of the function $TR_k$ removed and with the target sets of functions $TR_j$ removed so that j<k. We can thus define the function $TR_1$ as a function of the starting set of the polynomial P (more generally of the function P), then $TR_k$ (for all k>1, by considering the indexes k in increasing order from 2 to M) as a function of the target set of functions $TR_j$ (j<k) and as a function of the starting set of the polynomial P. For example, in one possible implementation, the polynomial P takes its values from 1 ... (M+1)*N, and function $TR_1$ has as its target set N+1 ... 2*N, function $TR_2$ has as its target set 2*N+1 ... 3*N, ..., function $TR_M$ has as its target set M*N+1 ... (M+1)*N. An example of function $TR_k$ is therefore the function that associates index i with index i+k*N. Of course, other functions $TR_k$ are possible (for example function $TR_k$ which associates index i with index (k+1)*N+1−i, where i varies between 1 and N). Generation of the encoded element of index i (for any i among the N possible indexes i) of the indexed set of N encoded elements then comprises (and in one possible implementation, consists of) the generation of $s_1+s_2+$ ... $+s_M+1$ components $E\_VIC_i$, $E\_ANG_{1,1,i}$, $E\_ANG_{2,1,i}$, ... $E\_ANG_{s1,1,i}$, $E\_ANG_{1,2,i}$, $E\_ANG_{2,2,i}$, ... $E\_ANG_{s2,2,i}$, ... $E\_ANG_{1,M,i}$, $E\_ANG_{2,M,i}$, ... $E\_ANG_{sM,M,i}$. These $s_1+s_2+$ ... $+s_M+1$ components can be stored in the order indicated (first $E\_VIC_i$, then $E\_ANG_{1,1,i}$, $E\_ANG_{2,1,i}$, ... up to $E\_ANG_{sM,M,i}$) or in an arbitrary order, but this order is predefined so that during decoding, it is possible to selectively access these components (by knowing their order during encoding) from among the N*($s_1+s_2+$ ... $+s_M+1$) components generated.

Figure 8:
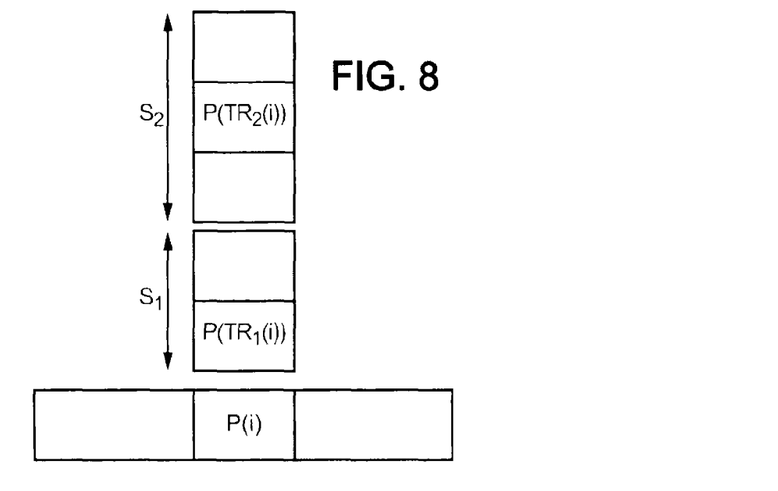
FIGS. 8 and 9 each illustrate an encoded element in implementations where a plurality of secondary elements are encoded for each primary element.
Figure 9:
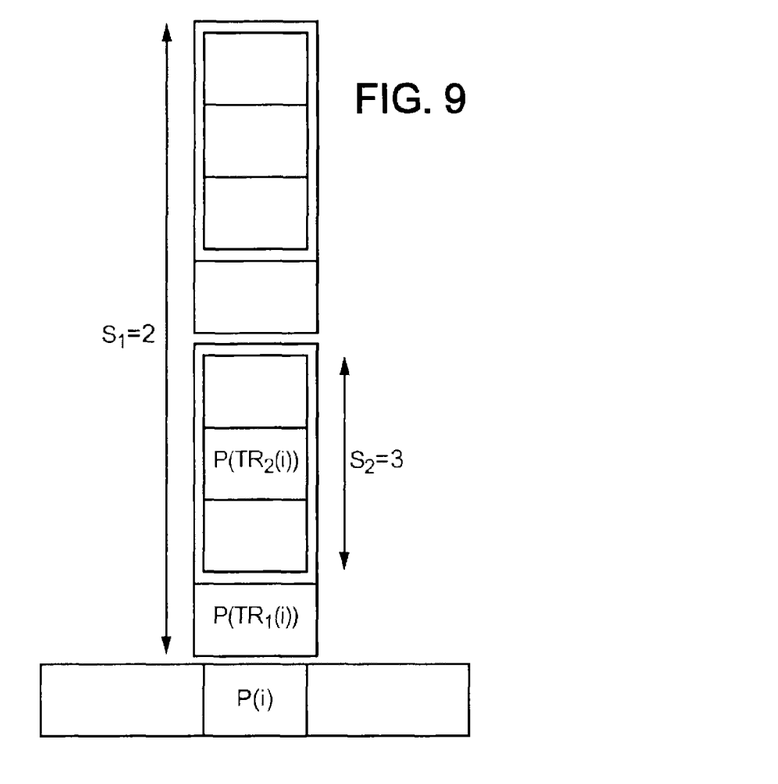

According to another possible implementation, in the case of an implementation comprising a plurality of sub-elements per main element, generating the encoded element of index i (for all i among the N possible indexes i) of the indexed set of N encoded elements comprises generating ( . . . $((s_M+i)*s_{M-1}+1) \ldots )*s_1+1$ components $E\_VIC_i$, $E\_ANG_{i,j,k}$. Each level is an encoding of the level below. These two possible implementations are illustrated in FIGS. 8 and 9.

Below, the case where R<N is not explicitly described but it is analogous, for example by adopting the hypothesis (referred to as the "index identity hypothesis") that the indexes used to identify the encoded elements of the indexed set of R encoded elements are such that when an encoded element contains an encoded main element, the index of this encoded element in the indexed set of R encoded elements is the same as the index of the corresponding main element in the indexed set of N possible elements. This may involve skipping indexes in the indexed set of R encoded elements, meaning that the set of indexes of the encoded elements of the indexed set of R encoded elements does not necessarily include all possible indexes between the smallest index of this set and the largest index of this set. This hypothesis is applied to simplify index comparisons (when speaking of equal indexes, we are speaking of indexes having the same numerical value). Of course, in a more general case, a function is defined (which can be an injection in one possible implementation) for the set of R indexes of the R encoded elements of the indexed set of R encoded elements towards the set of N indexes of N elements of the indexed set of N possible elements, and an index of the set of N indexes of the N elements of the indexed set of N possible elements is considered to be equal to an index of the set of R indexes of the R encoded elements of the indexed set of R encoded elements if said index of the set of N indexes of the N elements of the indexed set of N possible elements is equal to the result of said function applied to said index of the set of R indexes of the R encoded elements of the indexed set of R encoded elements. Similarly, even in the case where R=N, the use of such a function can be considered.

When the index i is not equal to any of the indexes of the K main elements $VIC_1$, $VIC_2$, ... $VIC_K$ in the indexed set of N possible elements (which in the current example is the case for N−K indexes and in the general case is the case for R−K indexes, even if R<N), the encoding electronic circuit ENC generates s+1 simulated components. In another possible implementation, the simulated components are valuations of another polynomial Q. This other polynomial Q may possibly give the illusion to an attacker that he has found the right polynomial P when in fact it is a decoy (polynomial Q). According to another possible implementation, the simulated components are generated as random numbers. The encoding circuit generates exactly s+1 random components, while according to another possible implementation it generates at least s+1 random components. For example, in one possible implementation with a plurality of secondary elements per main element, the encoding electronic circuit ENC generates exactly $s_1+s_2+ \ldots +s_M+1$ random components. Throughout the description, the term "random" is used instead of the more strict term "pseudo-random". Indeed, perfect randomness generally cannot be obtained, and the techniques used only aim to come close to perfect randomness (in a manner known in the art), for example using a physical entropy source (such as a hardware generator based on analog noise captured by an analog-to-digital converter) or a software entropy source, and a pseudo-random algorithm making use of this entropy source. This generation of random components corresponds to that which was previously described as noise. Thus, when one of the N possible elements is not represented among the K main elements, this element yields a purely random encoding. In one possible implementation, the encoding electronic circuit verifies that the component located at the first defined position (described below) is not equal to P(i), and if an equality is found it generates a new random number for the component until this random number is different from P(i). In one possible implementation, the encoding electronic circuit verifies that the component located at the second defined position (described below) is not equal to P(TR(i)), and if an equality is found it generates a new random number for the component until this random number is different from P(TR(i)).

Conversely, if unlike the preceding paragraph the index i is equal to the index of an element $VIC_j$ (the index is denoted j and not i because generally i≠j) among the K main elements $VIC_1$, $VIC_2$, ... $VIC_K$ in the indexed set of N possible elements, the three following arrangements are applied.

In one arrangement, the encoding electronic circuit ENC generates a component $E\_VIC_i$ equal to P(i) (the value of polynomial P for the index i concerned) at a first defined position of the generated components. This corresponds to an encoded main element. Each main element (even in the case where R<N) has a corresponding respective encoded main element (there are as many main elements as there are encoded main elements). The first defined position is, for example, one of the s+1 positions when exactly s+1 components are generated, or, in an implementation comprising a plurality of secondary elements per main element, the one of the $s_1+s_2+ \ldots +s_M+1$ positions or according to another variant ( . . . $((s_M+1)*s_{M-1}+1) \ldots )*s_1+1$ positions (corresponding to the components generated when exactly $s_1+s_2+ \ldots +s_M+1$ or in the other variant ( . . . $((s_M+1)*s_{M-1}+1) \ldots (*s_1+1$ components are generated). For example, this first position is position 1 of the s+1 positions (or position 1 of the $s_1+s_2+ \ldots +s_M+1$ positions in the second case considered). The position indicated by this first position is of little importance but is defined and shared with the decoding electronic circuit (one possible sharing consists for example of always using position 1 as the first position, in both circuits).

In addition, the encoding electronic circuit ENC generates a component $E\_ANG_{f(ANGj),i}$ obtained from P(TR(i)) (for example a component equal to P(TR(i))) at a second defined position of the generated components (for example a second defined position of the s+1 components generated when exactly s+1 components are generated), the second defined position being a function of the secondary element $ANG_j$ corresponding to the main element $VIC_j$ whose index in the indexed set of N possible elements is the index i. As above, the position indicated by the second position is of little importance as long as it is different from the first position and is different for each of the possible values of the secondary element $ANG_j$. In one possible implementation, the method uses double indexing to access the second position, but simple indexing is also possible (the choice of implementation makes no difference for the invention). In one possible implementation, the secondary element ANGj is an angle rounded to the closest multiple of 45° (angles between −22.5° and 22.49° being considered for example as 0°, angles between 22.5° and 67.49° being considered for example as 45°, and so on). Each 45° angular section may be numbered (for example from 0 to 7, or from 1 to 8) and encoded in three bits. In one possible implementation, a function f associates with the angular section (representing the angle) its 3-bit angular section number, and this number is used as a pointer to the second position. More generally, a function f can associate with any secondary element the binary representation of this secondary element, which (accepting s values) is for example a number between 0 and s−1. In one possible implementation, the value of the secondary element is its binary representation. For example, the secondary element is a three-bit angular value between 0 and 7 (the angular value being expressed in a different unit than conventional units such as degrees or radians). The function f can then be an identity (meaning that no function f is applied), which is possible for example in the case of double indexing, or in the case of simple indexing if the s positions which appear first are reserved for the s possible second positions. The function f can also be, for example, a translation of a component. In one possible implementation comprising a plurality of secondary elements per main element, where the encoding electronic circuit ENC generates exactly $s_1+s_2+\ldots+s_M+1$ components (with M>1), the encoding electronic circuit ENC generates M components $E\_ANG_{f(ANG_j,k),k,i}$ equal to $P(TR_k(i))$ at M defined second positions of the $s_1+s_2+\ldots+s_M+1$ generated components. One of these two defined positions corresponds to the second defined position according to the preceding implementation. These defined second positions are a function of the secondary elements $ANG_{j,k}$ corresponding to the main element $VIC_j$ whose index in the indexed set of N possible elements is the index i. As above, the positions indicated by the M second positions are of little importance as long as they are different from the first position and are different for each possible value of the secondary elements $ANG_{j,k}$.

Lastly, the encoding electronic circuit ENC generates (at least) s−1 components (in one possible implementation, it generates exactly s−1 remaining components of exactly s+1 generated components, namely $E\_ANG_{1,i}$, $E\_ANG_{2,i}$, ... $E\_ANG_{f(ANGj)-1,i}$, $E\_ANG_{f(ANGj)+1,i}$, ... $E\_ANG_{s,i}$) in a simulated manner (for example randomly, or via valuations of decoy polynomials, etc.). The notations in the preceding sentence could lead one to believe that $f(ANG_j)>3$ and $f(ANG_j)<s-1$, but there is of course no such constraint on $f(ANG_j)$ (which is only a notational convenience that is to be taken as equivalent to $\{E\_ANG_{k,i}\}$, k=1 ... s and k≠f ($ANG_j$)). In one possible implementation comprising a plurality of secondary elements per main element, in which the encoding electronic circuit ENC generates exactly $s_1+s_2+\ldots+s_M+1$ components (with M>1), the encoding electronic circuit ENC generates exactly $s_1+s_2+\ldots+s_M-M$ components in a simulated manner. These are the $s_1+s_2+\ldots+s_M-M$ remaining components of the $s_1+s_2+\ldots+s_M+1$ components, namely $E\_ANG_{1,1,i}$, $E\_ANG_{2,1,i}$, . . . $E\_ANG_{f(ANGj,1)-1,1,i}$, $E\_ANG_{f(ANGj,1)+1,1,i}$, ... $E\_ANG_{s1,1,i}$, ... $E-ANG_{1,M,i}$, $E\_ANG_{2,M,i}$, . . . $E\_ANG_{f(ANGj,M)-1,M,i}$, $E\_ANG_{f(ANGj,M)+1,M,i}$, ... $E\_ANG_{sM,M,i}$.

According to a second embodiment, a method for biometric enrollment comprises the obtaining, by an enrollment electronic circuit, of a reference biometric print of a user. The enrollment electronic circuit can thus comprise a biometric print sensor (for example a scanner that reads a fingerprint, iris, face, etc.) or a receiver capable of receiving such a biometric print from another circuit (responsible for obtaining it from a body part), possibly via a network. In one possible implementation, several biometric prints of the user are captured in order to obtain a more robust reference print. The reference print so obtained (during an initial enrollment phase) is then used to authenticate an authentication candidate claiming to be this same user, by (indirect) comparison with a print of the candidate.

In one possible implementation, the enrollment electronic circuit is a dedicated electronic circuit such as an FPGA, an ASIC, a PAL (or any other configurable electronic component), or possibly a fully customized electronic component. In another possible implementation, the enrollment electronic circuit comprises both a processor and associated memory (for example RAM, EEPROM, Flash, ROM, magnetic memory, optical memory, etc.), the associated memory containing a program (stored in the memory) able to execute a method according to the second embodiment (or, alternatively, able to execute a substantial part of said method).

According to the second embodiment, the method for biometric enrollment comprises the extraction, by the enrollment electronic circuit, from the reference biometric print, of K main elements $VIC_1$, $VIC_2$, ... $VIC_K$, each corresponding to a characteristic of the reference biometric print.

In one possible implementation, the main elements are vicinities of fingerprint minutiae. The vicinities are obtained, for example, according to the procedure described in the article "Adding Localization Information in a Fingerprint Binary Feature Vector Representation" by the present applicant (the authors are Julien Bringer, Vincent Despiegel, and Mélanie Favre), the content of this article being incorporated by reference. Thus, the vicinities can be determined according to the method described in section 2.1 (pages 2-3). To summarize, the minutiae are extracted from a fingerprint. Then, from each minutia, the set of minutiae located within a circle centered on this minutia and of a defined radius are determined.

According to the second embodiment, the method for biometric enrollment comprises the extraction, by the enrollment electronic circuit, from the biometric reference print, of K secondary elements $ANG_1$, $ANG_2$, ... $ANG_K$ each corresponding to at least one parameter of each of the respective K main elements $VIC_1$, $VIC_2$, ... $VIC_K$.

In one possible implementation, the secondary elements are, for each vicinity of fingerprint minutiae, the angle of the central minutia of this minutiae vicinity, obtained for example according to the procedure described in the article "Adding Localization information in a Fingerprint Binary Feature Vector Representation" cited above. This angle can be determined, for example, in the manner indicated in sections 4.2, 4.2.1, or 4.2.2 (pages 6-7). It may be encoded in three bits using a code known as a Gray code. Instead of the angle, it is equally possible to use as the secondary element another parameter such as the position of the vicinity concerned. The surface of the distal phalanx of a finger can be divided into four areas, and the position can correspond to the area where the vicinity is located (this area can be encoded in two bits). It is also possible to encode a plurality of parameters (for example, the angle in three bits and the position in two bits) within the same secondary element (therefore occupying five bits in the example given). In one possible implementation, the method encodes the position and angle in two groups of secondary elements. According to another possible implementation, the position is encoded in the s+1 components.

According to the second embodiment, the method for biometric enrollment comprises the obtaining, by the electronic enrollment circuit, of an indexing of the K main elements VIC1, VIC2 ... VICK relative to an indexed set of N possible elements, this set being a database of biometric print characteristics. For example, the indexed set of N possible elements can be a database of reference main elements (obtained, for example, by extraction from a biometric database containing many users). Each main element can then be compared with elements in the database. The index of the element of this database of main elements which is closest to the main element being considered is defined as the index of this main element. The proximity of the main element being considered to the elements in the database need not be (and usually is not) a simple measure of equality (it is rare that the main element being considered is strictly equal to one of the elements in the database), but is determined using a function measuring the similarity between two elements (for example such as the function described in the article "Binary Feature Vector Fingerprint Representation from Minutia Vicinities."

According to the second embodiment, the method for biometric enrollment comprises the obtaining, by the electronic enrollment circuit, from an indexed set of R elements encoded using encoding according to a method according to the first embodiment, of a polynomial P (or more generally a function P). This indexed set of R encoded elements is, for example, a vector of size R comprising R encoded elements, which can be stored for reference (for subsequent authentication for example). In one possible implementation of the second embodiment, R=N.

According to a third embodiment, a method for decoding information represented in polynomial form comprises the obtaining, by a decoding electronic circuit DEC, of an indexed set of R encoded elements. These R encoded elements are supposed to have been encoded on the basis of a polynomial P and a given injective function TR. The decoding is only successful under this hypothesis. Otherwise, in one possible implementation, the decoding method reports an error. In one possible implementation, the decoding returns an incorrect result.

In one possible implementation, the decoding electronic circuit is a dedicated electronic circuit such as an FPGA, an ASIC, a PAL (or any other configurable electronic component), or possibly a fully customized electronic component. In another possible implementation, the decoding electronic circuit comprises both a processor and associated memory (for example RAM, EEPROM, Flash, ROM, magnetic memory, optical memory, etc.), the associated memory containing a program (stored in the memory) able to execute a method according to the third embodiment (or, alternatively, able to execute a substantial part of said method).

According to the third embodiment, the method for decoding information comprises the obtaining, by the decoding electronic circuit DEC, of respective indexes of K' presumed main elements $VIC'_1$, $VIC'_2$ . . . $VIC'_{K'}$, each corresponding to a member of an indexed set of N possible elements used for obtaining the indexed set of R encoded elements, in this indexed set of N possible elements. These presumed main elements are supposed to match (without necessarily being strictly identical to) the main elements used when encoding the elements that the method for decoding information is to decode.

In one possible implementation, R=N. In one possible implementation, K' and K are equal. In one possible implementation, the number of main elements is constant, and in general one can expect a number of presumed main elements that is also constant (since a different number could be detected and considered as resulting from error or fraud). In one possible implementation, the method reports an error if K and/or K' do not have a value consistent with what is expected by the method.

According to the third embodiment, the method for decoding information comprises the obtaining, by the decoding electronic circuit DEC, of (at least) K' (and in one possible implementation, exactly K') presumed secondary elements $ANG'_1$, $ANG'_2$, . . . $ANG'_{K'}$ respectively associated with the K' presumed main elements $VIC'_1$, $VIC'_2$, . . . $VIC'_{K'}$, each secondary element $ANG'_1$, $ANG'_2$, . . . $ANG'_{K'}$ being able to assume s values. These presumed secondary elements are supposed to match (without necessarily being strictly identical to) the secondary elements used when encoding the elements that the information decoding method is now to decode. In one possible implementation, the method for decoding information includes the obtaining, by the decoding electronic circuit DEC, of M*K' (where M>1) presumed secondary elements $ANG'_{1,1}$, $ANG'_{2,1}$, . . . $ANG'_{K',1}$, . . . , $ANG'_{1,M}$, $ANG'_{2,M}$, . . . $ANG'_{K',M}$ respectively associated with the K' presumed main elements $VIC'_1$, $VIC'_2$, . . . $VIC'_{K'}$, each secondary element $ANG'_{1,k}$, $ANG'_{2,k}$, . . . $ANG'_{K',k}$ being able to assume $s_k$ values. These presumed secondary elements are intended to match (without necessarily being strictly identical to) the secondary elements used when encoding the elements that the information decoding method is now to decode. The notations $ANG'_1$, $ANG'_2$, . . . $ANG'_{K'}$ denote the same secondary elements as the notations $ANG'_{1,1}$, $ANG'_{2,1}$, . . . $ANG'_{K',1}$ (and $s_1$=s).

According to the third embodiment, the method for decoding information comprises the extraction, by the decoding electronic circuit DEC, of each encoded element whose index in the indexed set of R encoded elements is equal to the index of one of the K' presumed main elements $VIC'_1$, $VIC'_2$, . . . $VIC'_{K'}$ in the indexed set of N possible elements.

According to the third embodiment, the method for decoding information comprises, for each encoded element so extracted, the obtaining, by a decoding electronic circuit DEC, from said encoded element, of a first point whose abscissa is the index i of said encoded element in the indexed set of N encoded elements. The ordinate of this first point is the value of the component $E\_VIC'_i$ located at a first defined position of said encoded element. This first position is the same (relative) position as the one used during the corresponding encoding method. The method for decoding information also comprises, for each encoded element thus extracted, the obtaining from said encoded element by the decoding electronic circuit DEC, of a second point whose abscissa is the result of applying the injective function TR to the index of said encoded element in the indexed set of N encoded elements. The ordinate of the second point is the value of the component $E\_ANG'_{f(ANG'j),i}$ located at a second defined position of said encoded element. The second defined position is a function of the presumed secondary element $ANG'_j$ corresponding to the presumed main element $VIC'_j$ (the index is denoted j and not i because generally i≠j) whose index i in the indexed set of N possible elements is the same as the index of said encoded element in the indexed set of R encoded elements. This second position is calculated in the same manner as the second position used during the corresponding encoding method. In one possible implementation, for each encoded element extracted in this manner, the method for decoding information comprises the obtaining by the decoding electronic circuit DEC, from said encoded element, M second points (the first second point being the aforementioned second point) whose abscissas are the respective results of applying injective functions $TR_1$, $TR_2$, . . . , $TR_M$ to the index of said encoded element in the indexed set of R encoded elements. The ordinates of the M second points are the values of the components $E\_ANG'_{f(ANG'j,k),k,i}$ located at the M defined second positions of said encoded element. These defined second positions are a function of the presumed second elements $ANG'_{j,k}$ corresponding to the presumed main element $VIC'_j$ (the index is denoted j and not i because generally i≠j) whose index i in the indexed set of N possible elements is the same as the index of said encoded element in the indexed set of R encoded elements (meaning that the same two indexes are identical or matching indexes, similarly to the first embodiment—the "index identity hypothesis" and its generalization via a function, such as an injection). These M second positions are calculated in the same manner as the M second positions used during the corresponding encoding method (they are shared between the encoding electronic circuit and the decoding electronic circuit).

According to the third embodiment, the method for decoding information includes the obtaining, by the decoding electronic circuit DEC, of a decoded polynomial P' (or more generally a decoded function P'), by decoding (according to a given decoding algorithm) the points so obtained. The polynomial P' (or function P) thus decoded is equal to the polynomial P (or function P) if the R encoded elements were indeed encoded using the polynomial P (or function P) and the injective function TR, if the K' presumed main elements were indeed K' main elements corresponding to the K main elements used during encoding, and if the K' presumed secondary elements were indeed K' secondary elements corresponding to the K secondary elements used during encoding. In one possible implementation where M>1, the decoded polynomial P' (or function P') is equal to the polynomial P (or function P) if the R encoded elements were indeed encoded using the polynomial P (or function P) and the injective functions $TR_1, TR_2, \ldots, TR_M$, if the K' presumed main elements were indeed K' main elements corresponding to the K main elements used during encoding, and if the M*K' presumed secondary elements were indeed M*K' secondary elements corresponding to the M*K secondary elements used during encoding.

In one possible implementation, the decoding is an interpolation (the decoding algorithm is an interpolation algorithm). In another implementation, the decoding is based on a Reed-Solomon code. In another implementation, the decoding is based on an algebraic code.

According to a fourth embodiment, a method for biometric authentication comprises the obtaining, by an authentication electronic circuit, of a polynomial P and of an indexed set of R elements encoded during an enrollment process using the polynomial P.

The method for biometric authentication comprises the obtaining, by the authentication electronic circuit, of a presumed biometric print of an authentication candidate. The method for biometric authentication aims to determine whether the indexed set of R encoded elements (which may, for example, be a vector of size N comprising R encoded elements) was encoded with information derived from a biometric print very close to the presumed biometric print (meaning it is considered to be from the same person).

In one possible implementation, the authentication electronic circuit is a dedicated electronic circuit such as an FPGA, an ASIC, a PAL (or any other configurable electronic component), or possibly a fully customized electronic component. In another possible implementation, the authentication electronic circuit comprises both a processor and associated memory (for example RAM, EEPROM, Flash, ROM, magnetic memory, optical memory, etc.), the associated memory containing a program (stored in the memory) able to execute a method according to the fourth embodiment (or, alternatively, able to execute a substantial part of said method).

The method for biometric authentication according to the fourth embodiment comprises the extraction, by the authentication electronic circuit, from the presumed biometric print, of K' presumed main elements $VIC'_1, VIC'_2, \ldots VIC'_{K'}$, each corresponding to a characteristic of the presumed biometric print. In one possible implementation, the presumed main elements are vicinities of fingerprint minutiae. Explanations concerning the obtaining of main elements within the context of the second embodiment also apply to the presumed main elements of the fourth embodiment.

The method for biometric authentication also comprises the extraction, by the authentication electronic circuit, from the presumed biometric print, of (at least) K' (and in one possible implementation exactly K') presumed secondary elements $ANG'_1, ANG'_2, \ldots ANG'_{K'}$ each corresponding to at least one parameter of each of the respective K' presumed main elements $VIC'_1, VIC'_2, \ldots VIC'_{K'}$. In one possible implementation, the presumed secondary elements are, for each vicinity of fingerprint minutiae, the angle of the central minutia of this minutiae vicinity, or the position of the vicinity being considered, or a combination of several parameters (such as the angle in three bits and the position in two bits) within one secondary member (therefore occupying five bits in the given example) or within a plurality of secondary elements. Explanations concerning the obtaining of secondary elements within the context of the second embodiment also apply to the presumed secondary elements in the context of the fourth embodiment. In one possible implementation, the method for biometric authentication comprises the extraction, by the electronic authentication circuit, from the presumed biometric fingerprint, of M*K' presumed secondary elements $ANG'_{1,1}, ANG'_{2,1}, \ldots ANG'_{K',1}, \ldots, ANG'_{1,M}, ANG'_{2,M}, \ldots ANG'_{K',M}$ each corresponding to at least one parameter of each of the respective K' presumed main elements $VIC'_1, VIC'_2, \ldots VIC'_{K'}$.

The method for biometric authentication according to the fourth embodiment comprises the obtaining, by the authentication electronic circuit, of an indexing of the K' presumed main elements $VIC'_1, VIC'_2, \ldots VIC'_{K'}$ relative to an indexed set of N possible elements, this set being a database of biometric print characteristics. Explanations regarding the obtaining of an indexing in the context of the second embodiment are also applicable to obtaining an indexing in the context of the fourth embodiment.

The method for biometric authentication according to the fourth embodiment comprises the obtaining, by the authentication electronic circuit, by decoding according to a method according to the third embodiment, of a polynomial P' (or more generally a function P'). This interpolated polynomial P' obtained by the decoding method of the third embodiment is supposed to correspond to the polynomial P (or more generally to the function P) shared by the encoding circuit and decoding circuit.

The method for biometric authentication according to the fourth embodiment comprises the authentication, by the authentication electronic circuit, of the candidate if polynomial P' corresponds to polynomial P. In one possible implementation, answering the question of whether the two polynomials match consists of checking whether they are equal. In one possible implementation, answering the question of whether the two polynomials match consists of checking whether their respective hashes are equal (for example the method computes a hash SHA-1 for each of the two polynomials and checks whether these two hashes are equal). This applies more broadly to a function P and a function P'.

According to a fifth embodiment, an encoding electronic circuit ENC for encoding information represented in the form of a function P is arranged to implement a method according to the first embodiment.

This encoding circuit comprises an obtaining electronic circuit for obtaining respective indexes of K main elements $VIC_1, VIC_2, \ldots VIC_K$, each corresponding to an element of an indexed set of N possible elements, in this indexed set of N possible elements.

This encoding circuit comprises an obtaining electronic circuit for obtaining K secondary elements $ANG_1$, $ANG_2, \ldots ANG_K$ respectively associated with the K main elements ($VIC_1, VIC_2, \ldots VIC_K$), each secondary element ($ANG_1, ANG_2, \ldots ANG_K$) being able to assume s values.

This encoding circuit comprises a generating electronic circuit for generating an indexed set of R encoded elements, using the function P and an injective function TR having for the starting set the set of N indexes of the indexed set of N possible elements and having for the target set the starting set of the polynomial P with the starting set of the function TR removed, the generation of the encoded element of index i of the indexed set of R encoded elements comprising the generation of s+1 components $E\_VIC_i$, $E\_ANG_{1,i}$, $E\_ANG_{2,i}, \ldots E\_ANG_{s,i}$.

The generating electronic circuit is arranged, when the index i is not equal to any of the indexes of the K main elements $VIC_1, VIC_2, \ldots VIC_K$ in the indexed set of N possible elements, to generate s+1 simulated components.

The generating electronic circuit is arranged, when the index i is equal to the index of one ($VIC_j$) of the K main elements $VIC_1, VIC_2, \ldots VIC_K$ in the indexed set of N possible elements, to generate a component $E\_VIC_i$ equal to P(i) at a first defined position of the generated components, to generate a component $E\_ANG_{f(ANGj),i}$ equal to P(TR(i)) at a second defined position of the generated components, the second defined position being a function of the secondary element $ANG_j$ corresponding to the main element $VIC_j$ whose index in the indexed set of N possible elements is the index i, and to generate s−1 simulated components $E\_ANG_{1,i}$, $E\_ANG_{2,i}$, . . . $E\_ANG_{f(ANGj)-1,i}$, $E\_ANG_{f(ANGj)+1,i}, \ldots E\_ANG_{s,i}$.

In one possible implementation, the obtaining electronic circuit(s) and the generating electronic circuit are each a dedicated electronic circuit such as an FPGA, an ASIC, a PAL (or any other configurable electronic component), or possibly a completely custom electronic component. In another possible implementation, each of these electronic circuits comprises both a processor and associated memory (for example RAM, EEPROM, Flash, ROM, magnetic memory, optical memory, etc.), the associated memory containing a program (stored in the memory) able to execute the respective method that this electronic circuit is to implement.

According to a sixth embodiment, an electronic circuit for biometric enrollment is arranged to implement a method according to the second embodiment.

The electronic circuit for biometric enrollment comprises an obtaining electronic circuit for obtaining a reference biometric print for a user.

The electronic circuit for biometric enrollment comprises an extracting electronic circuit for extracting, from the reference biometric print, K main elements $VIC_1$, $VIC_2, \ldots VIC_K$ each corresponding to a characteristic of the reference biometric print, and K secondary elements $ANG_1$, $ANG_2, \ldots ANG_K$ each corresponding to at least one parameter of each of the respective K main elements $VIC_1$, $VIC_2, \ldots VIC_K$.

The electronic circuit for biometric enrollment comprises an obtaining electronic circuit for obtaining an indexing of the K main elements $VIC_1, VIC_2, \ldots VIC_K$ relative to an indexed set of N possible elements, this set being a database of biometric print characteristics.

The electronic circuit of biometric enrollment comprises an obtaining electronic circuit for obtaining a polynomial P (or more generally a function P) from an indexed set of R elements encoded by encoding using an encoding electronic circuit ENC according to the fifth embodiment. In one possible implementation, said obtaining electronic circuit comprises said encoding electronic circuit ENC. In one possible implementation, said encoding electronic circuit ENC is said obtaining electronic circuit.

In one possible implementation, the obtaining electronic circuit(s) and the extracting electronic circuit are each a dedicated electronic circuit such as an FPGA, an ASIC, a PAL (or any other configurable electronic component), or possibly a completely custom electronic component. In another possible implementation, each of these electronic circuits comprises both a processor and associated memory (for example RAM, EEPROM, Flash, ROM, magnetic memory, optical memory, etc.), the associated memory containing a program (stored in the memory) able to execute the respective method that the electronic circuit is to implement.

According to a seventh embodiment, an information decoding electronic circuit DEC for decoding information represented in the form of a polynomial is arranged to implement a method according to the third embodiment.

The information decoding electronic circuit comprises an obtaining electronic circuit for obtaining an indexed set of R encoded elements, supposed to have been encoded on the basis of a function P and a given injective function TR.

The information decoding electronic circuit comprises an obtaining electronic circuit for obtaining respective indexes of K' presumed main elements $VIC'_1, VIC'_2, \ldots VIC'_{K'}$, each corresponding to an element of an indexed set of N possible elements used for obtaining the indexed set of R encoded elements, in this indexed set of N possible elements.

The information decoding electronic circuit comprises an obtaining electronic circuit for obtaining K' presumed secondary elements $ANG'_1, ANG'_2, \ldots ANG'_{K'}$ respectively associated with the K' presumed main elements $VIC'_1$, $VIC'_2, \ldots VIC'_{K'}$, each secondary element $ANG'_1$, $ANG'_2, \ldots ANG'_{K'}$ being able to assume s values.

The information decoding electronic circuit comprises an extracting electronic circuit for extracting each encoded element whose index in the indexed set of R encoded elements is equal to the index of one of the K' presumed main elements $VIC'_1, VIC'_2, \ldots VIC'_{K'}$ in the indexed set of N possible elements.

The information decoding electronic circuit comprises an obtaining electronic circuit for obtaining, for each encoded element so extracted, based on said encoded element, a first point whose abscissa is the index of said encoded element in the indexed set of N encoded elements and whose ordinate is the value of the component $E\_VIC'_i$ located at a first defined position of said encoded element, and a second point whose abscissa is the result of applying the injective function TR to the index of said encoded element in the indexed set of N encoded elements and whose ordinate is the value of the component $E\_ANG'_{f(ANG'j),i}$ located at a second defined position of said encoded element, the second defined position being a function of the presumed secondary element $ANG'_j$ corresponding to the presumed main element $VIC'_j$ whose index in the indexed set of N possible elements is the same as the index of said encoded element in the indexed set of R encoded elements.

The information decoding electronic circuit comprises an obtaining electronic circuit for obtaining a function P', by decoding the points so obtained.

In one possible implementation, the obtaining electronic circuit(s) and the extracting electronic circuit are each a dedicated electronic circuit such as an FPGA, an ASIC, a PAL (or any other configurable electronic component), or possibly a completely custom electronic component. In another possible implementation, each of these electronic circuits comprises both a processor and associated memory (for example RAM, EEPROM, Flash, ROM, magnetic memory, optical memory, etc.), the associated memory containing a program (stored in the memory) able to execute the respective method that this electronic circuit is to implement.

According to an eighth embodiment, an electronic circuit for biometric authentication is arranged to implement a method according to the fourth embodiment.

The electronic circuit for biometric authentication comprises an obtaining electronic circuit for obtaining a function P and an indexed set of R elements encoded during an enrollment process using the function P.

The electronic circuit for biometric authentication comprises an obtaining electronic circuit for obtaining a presumed biometric print of an authentication candidate.

The electronic circuit for biometric authentication comprises an extracting electronic circuit for extracting, from the presumed biometric print, K' presumed main elements $VIC'_1, VIC'_2, \ldots VIC'_{K'}$ each corresponding to a characteristic of the presumed biometric print, and K' presumed secondary elements $ANG'_1, ANG'_2, \ldots ANG'_{K'}$ each corresponding to at least one parameter of each of the respective K' presumed main elements $VIC'_1, VIC'_2, \ldots VIC'_{K'}$.

The electronic circuit for biometric authentication comprises an obtaining electronic circuit for obtaining an indexing of the K' presumed main elements $VIC'_1, VIC'_2, \ldots VIC'_{K'}$ relative to an indexed set of N possible elements, this set being a database of biometric print characteristics.

The electronic circuit for biometric authentication comprises an obtaining electronic circuit for the obtaining, by a decoding electronic circuit DEC according to the seventh embodiment, of a function P'. In one possible implementation, this obtaining electronic circuit comprises said decoding electronic circuit. In one possible implementation, the decoding electronic circuit is the obtaining electronic circuit.

The electronic circuit for biometric authentication comprises a verification electronic circuit, arranged to authenticate the candidate if function P' corresponds to function P.

In one possible implementation, the obtaining electronic circuit(s), the extracting electronic circuit, and the verification electronic circuit are each a dedicated electronic circuit such as an FPGA, an ASIC, a PAL (or any other configurable electronic component), or possibly a fully customized electronic component. In another possible implementation, each of these electronic circuits comprises both a processor and associated memory (for example RAM, EEPROM, Flash, ROM, magnetic memory, optical memory, etc.), the associated memory containing a program (stored in the memory) able to execute the respective method that this electronic circuit is to implement.

According to a ninth embodiment, a computer program comprises a sequence of instructions which, when executed by a processor, implement a method according to one of the first to fourth embodiments. This program may be written, for example, in assembler, in C, or in any other suitable programming language.

According to a tenth embodiment, a non-transitory computer-readable storage medium stores a computer program according to the ninth embodiment. The storage medium is, for example, RAM memory with battery backup or EEPROM or ROM or Flash, or magnetic memory, or optical memory.

The features disclosed regarding the methods of the invention are transposable to the corresponding devices (circuits) according to the invention, and vice versa.

Of course, the present invention is not limited to the embodiments described above by way of non-limiting examples. In particular, the invention is not limited to biometric techniques based on fingerprints.

The invention claimed is:

1. A method for encoding biometric print information represented in the form of a function P into a set, comprising:

/a/ obtaining, by an encoding electronic circuit (ENC), respective indexes of K main elements ($VIC_1$, $VIC_2$, . . . $VIC_K$) of a reference biometric print, each corresponding to an element of an indexed set of N possible elements, this indexed set of N possible elements being a database of biometric print characteristics, /b/ obtaining, by the encoding electronic circuit (ENC), K secondary elements ($ANG_1, ANG_2, \ldots ANG_K$) respectively associated with the K main elements ($VIC_1$, $VIC_2$, . . . $VIC_K$), each secondary element ($ANG_1$, $ANG_2, \ldots ANG_K$) being able to assume s values, /c/ generating, by the encoding electronic circuit (ENC), an indexed set of R encoded elements comprising K encoded main elements, R being an integer between K+1 and N, using the function P and an injective function TR having as a starting set the set of the N indexes of the indexed set of N possible elements and having as a target set the starting set of function P with the starting set of function TR removed, generating an encoded element of index i of the indexed set of R encoded elements comprising generating s+1 components ($E\_VIC_i$, $E\_ANG_{1,i}$, $E\_ANG_{2,i}$, . . . $E\_ANG_{s,i}$), namely:

/c1/ when the index i is not equal to any of the indexes of the K main elements ($VIC_1, VIC_2, \ldots VIC_K$) in the indexed set of N possible elements, generating, by the encoding electronic circuit (ENC), s+1 simulated components, and /c2/ when the index i is equal to the index of one ($VIC_j$) of the K main elements ($VIC_1, VIC_2, \ldots VIC_K$) in the indexed set of N possible elements, /c2A/ generating, by the encoding electronic circuit (ENC), an encoded main element of the biometric print in the form of a component ($E\_VIC_i$) equal to P(i) at a first defined position of the generated components, /c2B/ generating, by the encoding electronic circuit (ENC), a component ($E\_ANG_{f(ANGj),i}$) obtained using P(TR(i)) at a second defined position of the generated components, the second defined position being a function of the secondary element ($ANG_j$) corresponding to the main element ($VIC_j$) of the biometric print whose index in the indexed set of N possible elements is the index i, and /c2C/ generating, by the encoding electronic circuit (ENC), s−1 simulated components ($E\_ANG_{1,i}$, $E\_ANG_{2,i}$, . . . $E\_ANG_{f(ANGj)-1,i}$, $E\_ANG_{f(ANGj)+1,i}$, . . . $E\_ANG_{s,i}$), the biometric print information being thereby encoded into said indexed set of R encoded elements.

2. A method for biometric enrollment, comprising:
/1/ obtaining, by an enrollment electronic circuit, a reference biometric print of a user,
/2/ extracting, by the enrollment electronic circuit, from the reference biometric print, K main elements ($VIC_1$, $VIC_2$, ... $VIC_K$) each corresponding to a characteristic of the reference biometric print, and K secondary elements ($ANG_1$, $ANG_2$, ... $ANG_K$) each corresponding to at least one parameter of each of the respective K main elements ($VIC_1$, $VIC_2$, ... $VIC_K$),
/3/ obtaining, by the enrollment electronic circuit, an indexing of the K main elements ($VIC_1$, $VIC_2$, ... $VIC_K$) relative to an indexed set of N possible elements, this set being a database of biometric print characteristics,
/4/ obtaining, by the enrollment electronic circuit, from an indexed set of R elements encoded using encoding according to the method of claim 1, a function P.

3. A method for decoding biometric print information represented in the form of a function, comprising:
/d/ obtaining, by a decoding electronic circuit (DEC), an indexed set of R encoded elements,
/e/ obtaining, by the decoding electronic circuit (DEC), respective indexes of K' presumed main elements ($VIC'_1$, $VIC'_2$, ... $VIC'_{K'}$), each corresponding to a characteristic of a presumed biometric print and a member of an indexed set of N possible elements used for obtaining the indexed set of R encoded elements, this indexed set of N possible elements being a database of biometric print characteristics,
/f/ obtaining, by the decoding electronic circuit (DEC), K' presumed secondary elements ($ANG'_1$, $ANG'_2$, ... $ANG'_{K'}$) respectively associated with the K' presumed main elements ($VIC'_1$, $VIC'_2$, ... $VIC'_{K'}$), each secondary element ($ANG'_1$, $ANG'_2$, ... $ANG'_{K'}$) being able to assume s values,
/g/ extracting, by the decoding electronic circuit (DEC), each encoded element whose index in the indexed set of R encoded elements is equal to the index of one of the K' presumed main elements ($VIC'_1$, $VIC'_2$, ... $VIC'_{K'}$) in the indexed set of N possible elements,
/h/ for each encoded element so extracted, obtaining, by the decoding electronic circuit (DEC), from said encoded element, a first point whose abscissa is the index of said encoded element in the indexed set of R encoded elements and whose ordinate is the value of the component ($E\_VIC_i$) located at a first defined position of said encoded element, and a second point whose abscissa is the result of applying a given injective function TR to the index of said encoded element in the indexed set of R encoded elements and whose ordinate is the value of the component ($E\_ANG'_{f(ANG'j),i}$) located at a second defined position of said encoded element, the second defined position being a function of the presumed secondary element ($ANG'_j$) corresponding to the presumed main element ($VIC'_j$) whose index in the indexed set of N possible elements is the same as the index of said encoded element in the indexed set of R encoded elements,
/i/ obtaining, by the decoding electronic circuit (DEC), a function P', by decoding the points thus obtained.

4. A method for biometric authentication, comprising:
/5/ obtaining, by an authentication electronic circuit, a function P and of an indexed set of R encoded elements,
/6/ obtaining, by the authentication electronic circuit, a presumed biometric print of an authentication candidate,
/7/ extracting, by the authentication electronic circuit, from the presumed biometric print, K' presumed main elements ($VIC'_1$, $VIC'_2$, ... $VIC'_{K'}$) each corresponding to a characteristic of the presumed biometric print, and of K' presumed secondary elements ($ANG'_1$, $ANG'_2$, ... $ANG'_{K'}$) each corresponding to at least one parameter of each of the respective K' presumed main elements ($VIC'_1$, $VIC'_2$, ... $VIC'_{K'}$),
/8/ obtaining, by the authentication electronic circuit, an indexing of the K' presumed main elements ($VIC'_1$, $VIC'_2$, ... $VIC'_{K'}$) relative to an indexed set of N possible elements, this set being a database of biometric print characteristics,
/9/ obtaining, by the authentication electronic circuit, by decoding according to the method of claim 3, a function P',
/10/ authenticating, by the authentication electronic circuit, the candidate if function P' corresponds to function P.

5. An encoding electronic circuit (ENC) for encoding biometric print information represented in the form of a function P into a set, comprising:
an obtaining electronic circuit for obtaining respective indexes of K main elements ($VIC_1$, $VIC_2$, ... $VIC_K$) of a reference biometric print, each corresponding to an element of an indexed set of N possible elements, this indexed set of N possible elements being a database of biometric print characteristics,
an obtaining electronic circuit for obtaining K secondary elements ($ANG_1$, $ANG_2$, ... $ANG_K$) respectively associated with the K main elements ($VIC_1$, $VIC_2$, ... $VIC_K$), each secondary element ($ANG_1$, $ANG_2$, ... $ANG_K$) being able to assume s values,
a generating electronic circuit for generating an indexed set of R encoded elements, using the function P and an injective function TR having for the starting set the set of N indexes of the indexed set of N possible elements and having for the target set the starting set of the function P with the starting set of the function TR removed, the generation of the encoded element of index i of the indexed set of R encoded elements comprising the generation of s+1 components ($E\_VIC_i$, $E\_ANG_{1,i}$, $E\_ANG_{2,i}$, ... $E\_ANG_{s,i}$),
the generating electronic circuit being arranged, when the index i is not equal to any of the indexes of the K main elements ($VIC_1$, $VIC_2$, ... $VIC_K$) in the indexed set of N possible elements, to generate s+1 simulated components, and
the generating electronic circuit being arranged, when the index i is equal to the index of one ($VIC_j$) of the K main elements ($VIC_1$, $VIC_2$, ... $VIC_K$) in the indexed set of N possible elements, to generate an encoded main element of the biometric print in the form of a component ($E\_VIC_i$) equal to P(i) at a first defined position of the generated components, to generate a component ($E\_ANG_{f(ANGj),i}$) obtained based on P(TR(i)) at a second defined position of the generated components, the second defined position being a function of the secondary element ($ANG_j$) corresponding to the main element ($VIC_j$) of the biometric print whose index in the indexed set of N possible elements is the index i, and to generate s−1 simulated components ($E\_ANG_{1,i}$, $E\_ANG_{2,i}$, ... $E\_ANG_{f(ANGj)-1,i}$, $E\_ANG_{f(ANGj)+1,i}$, ... $E\_ANG_{s,i}$), the biometric print information being thereby encoded into said indexed set of R encoded elements.

6. An electronic circuit for biometric enrollment, comprising:
- an obtaining electronic circuit for obtaining a reference biometric print of a user,
- an extracting electronic circuit for extracting, from the reference biometric print, K main elements ($VIC_1$, $VIC_2$, ... $VIC_K$) each corresponding to a characteristic of the reference biometric print, and K secondary elements ($ANG_1$, $ANG_2$, ... $ANG_K$) each corresponding to at least one parameter of each of the respective K main elements ($VIC_1$, $VIC_2$, ... $VIC_K$),
- an obtaining electronic circuit for obtaining an indexing of the K main elements ($VIC_1$, $VIC_2$, ... $VIC_K$) relative to an indexed set of N possible elements, this set being a database of biometric print characteristics,
- an obtaining electronic circuit for obtaining a function P from an indexed set of R elements encoded by encoding, using an encoding electronic circuit (ENC) according to claim 5.

7. An information decoding electronic circuit (DEC) for decoding biometric print information represented in the form of a function, comprising:
- an obtaining electronic circuit for obtaining an indexed set of R encoded elements,
- an obtaining electronic circuit for obtaining respective indexes of K' presumed main elements ($VIC'_1$, $VIC'_2$, ... $VIC'_{K'}$), each corresponding to a characteristic of a presumed biometric print and an element of an indexed set of N possible elements used for obtaining the indexed set of R encoded elements, this indexed set of N possible elements being a database of biometric print characteristics,
- an obtaining electronic circuit for obtaining K' presumed secondary elements ($ANG'_1$, $ANG'_2$, ... $ANG'_{K'}$) respectively associated with the K' presumed main elements ($VIC'_1$, $VIC'_2$, ... $VIC'_{K'}$), each secondary element ($ANG'_1$, $ANG'_2$, ... $ANG'_K$) being able to assume s values, an extracting electronic circuit for extracting each encoded element whose index in the indexed set of R encoded elements is equal to the index of one of the K' presumed main elements ($VIC'_1$, $VIC'_2$, ... $VIC'_j$) in the indexed set of N possible elements,
- an obtaining electronic circuit for obtaining, for each encoded element so extracted, based on said encoded element, a first point whose abscissa is the index of said encoded element in the indexed set of R encoded elements and whose ordinate is the value of the component ($E\_VIC'_i$) located at a first defined position of said encoded element, and a second point whose abscissa is the result of applying a given injective function TR to the index of said encoded element in the indexed set of R encoded elements and whose ordinate is the value of the component ($E\_ANG'_{f(ANG'j),i}$) located at a second defined position of said encoded element, the second defined position being a function of the presumed secondary element ($ANG'_j$) corresponding to the presumed main element ($VIC'_j$) whose index in the indexed set of N possible elements is the same as the index of said encoded element in the indexed set of R encoded elements,
- an obtaining electronic circuit for obtaining a function P', by decoding the points so obtained.

8. An electronic circuit for biometric authentication, comprising:
- an obtaining electronic circuit for obtaining a function P and an indexed set of R encoded elements, an obtaining electronic circuit for obtaining a presumed biometric print of an authentication candidate,
- an extracting electronic circuit for extracting, from the presumed biometric print, K' presumed main elements ($VIC'_1$, $VIC'_2$, ... $VIC'_{K'}$) each corresponding to a characteristic of the presumed biometric print, and K' presumed secondary elements ($ANG'_1$, $ANG'_2$, ... $ANG'_{K'}$) each corresponding to at least one parameter of each of the respective K' presumed main elements ($VIC'_1$, $VIC'_2$, ... $VIC'_{K'}$),
- an obtaining electronic circuit for obtaining an indexing of the K' presumed main elements ($VIC'_1$, $VIC'_2$, ... $VIC'_{K'}$) relative to an indexed set of N possible elements, this set being a database of biometric print characteristics,
- an obtaining electronic circuit for the obtaining, by a decoding electronic circuit (DEC) according to claim 7, of a function P', a verification electronic circuit, arranged to authentication the candidate if function P' corresponds to function P.

9. A non-transitory computer-readable storage medium, said medium storing a computer program comprising a sequence of instructions which, when executed by a processor, cause the processor to:
- obtain, by an encoding electronic circuit (ENC), respective indexes of K main elements ($VIC_1$, $VIC_2$, ... $VIC_K$) of a reference biometric print, each corresponding to an element of an indexed set of N possible elements, this indexed set of N possible elements being a database of biometric print characteristics,
- obtain, by the encoding electronic circuit (ENC), K secondary elements ($ANG_1$, $ANG_2$, ... $ANG_K$) respectively associated with the K main elements ($VIC_1$, $VIC_2$, ... $VIC_K$), each secondary element ($ANG_1$, $ANG_2$, ... $ANG_K$) being able to assume s values,
- generate, by the encoding electronic circuit (ENC), an indexed set of R encoded elements comprising K encoded main elements, R being an integer between K+1 and N, using the function P and an injective function TR having as a starting set the set of the N indexes of the indexed set of N possible elements and having as a target set the starting set of function P with the starting set of function TR removed, generating an encoded element of index i of the indexed set of R encoded elements comprising generating s+1 components ($E\_VIC_i$, $E\_ANG_{1,i}$, $E\_ANG_{2,i}$, ... $E\_ANG_{s,i}$), namely:
  - when the index i is not equal to any of the indexes of the K main elements ($VIC_1$, $VIC_2$, ... $VIC_K$) in the indexed set of N possible elements, generate, by the encoding electronic circuit (ENC), s+1 simulated components, and
  - when the index i is equal to the index of one ($VIC_j$) of the K main elements ($VIC_1$, $VIC_2$, ... $VIC_K$) in the indexed set of N possible elements,
    - generate, by the encoding electronic circuit (ENC), an encoded main element in the form of a component ($E\_VIC_i$) equal to P(i) at a first defined position of the generated components,
    - generate, by the encoding electronic circuit (ENC), a component ($E\_ANG_{f(ANGj),i}$) obtained using P(TR (i)) at a second defined position of the generated components, the second defined position being a function of the secondary element ($ANG_j$) corresponding to the main element ($VIC_j$) whose index in the indexed set of N possible elements is the index i, and generate, by the encoding electronic circuit (ENC), s−1 simulated components ($E\_ANG_{1,i}$, $E\_ANG_{2,i}$, ... $E\_ANG_{f(ANGj)-1,i}$, $E\_ANG_{f(ANGj)+1,i}$, ... $E\_ANG_{s,i}$).

10. A non-transitory computer-readable storage medium, said medium, storing a computer program comprising a sequence of instructions which, when executed by a processor, cause the processor to:
- obtain, by a decoding electronic circuit (DEC), an indexed set of R encoded elements,
- obtain, by the decoding electronic circuit (DEC), respective indexes of K' presumed main elements ($VIC'_1$, $VIC'_2$, ... $VIC'_{K'}$), each corresponding to a characteristic of a presumed biometric print and a member of an indexed set of N possible elements used for obtaining the indexed set of R encoded elements, this indexed set of N possible elements being a database of biometric print characteristics,
- obtain, by the decoding electronic circuit (DEC), K' presumed secondary elements ($ANG'_1$, $ANG'_2$, ... $ANG'_{K'}$) respectively associated with the K' presumed main elements ($VIC'_1$, $VIC'_2$, ... $VIC'_{K'}$), each secondary element ($ANG'_1$, $ANG'_2$, ... $ANG'_{K'}$) being able to assume s values,
- extract, by the decoding electronic circuit (DEC), each encoded element whose index in the indexed set of R encoded elements is equal to the index of one of the K' presumed main elements ($VIC'_1$, $VIC'_2$, ... $VIC'_{K'}$) in the indexed set of N possible elements,
- for each encoded element so extracted, obtain, by the decoding electronic circuit (DEC), from said encoded element, a first point whose abscissa is the index of said encoded element in the indexed set of R encoded elements and whose ordinate is the value of the component ($E\_VIC'_i$) located at a first defined position of said encoded element, and a second point whose abscissa is the result of applying a given injective function TR to the index of said encoded element in the indexed set of R encoded elements and whose ordinate is the value of the component ($E\_ANG'_{f(ANG'j),i}$) located at a second defined position of said encoded element, the second defined position being a function of the presumed secondary element ($ANG'_j$) corresponding to the presumed main element ($VIC'_j$) whose index in the indexed set of N possible elements is the same as the index of said encoded element in the indexed set of R encoded elements, and
- obtain, by the decoding electronic circuit (DEC), a function P', by decoding the points thus obtained.

* * * * *

UNITED STATES PATENT AND TRADEMARK OFFICE
CERTIFICATE OF CORRECTION

PATENT NO. : 9,742,567 B2
APPLICATION NO. : 14/571678
DATED : August 22, 2017
INVENTOR(S) : J. Bringer et al.

It is certified that error appears in the above-identified patent and that said Letters Patent is hereby corrected as shown below:

| Column | Line | |
|---|---|---|
| 20 (Claim 1) | 64 | "$E\_ANG_{f(ANGj)-1}$," should read --$E\_ANG_{f(ANGj)-1,i}$-- |
| 23 (Claim 7) | 37 | "$ANG'_K$" should read --$ANG'_{K'}$-- |
| 23 (Claim 7) | 42 | "$VIC'_j$" should read --$VIC'_{K'}$-- |

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*